US011954019B2

United States Patent
Sharma et al.

(10) Patent No.: US 11,954,019 B2
(45) Date of Patent: Apr. 9, 2024

(54) MACHINE LEARNING TECHNIQUES FOR AUTOMATED SOFTWARE TESTING CONFIGURATION MANAGEMENT

(71) Applicant: Optum, Inc., Minnetonka, MN (US)

(72) Inventors: Pawan Sharma, New Delhi (IN); Atul B. Subhash, Bengaluru (IN); Kumar Shailendra, Basking Ridge, NJ (US)

(73) Assignee: Optum, Inc., Minnetonka, MN (US)

( * ) Notice: Subject to any disclaimer, the term of this patent is extended or adjusted under 35 U.S.C. 154(b) by 112 days.

(21) Appl. No.: 17/665,074

(22) Filed: Feb. 4, 2022

(65) Prior Publication Data
US 2023/0251960 A1  Aug. 10, 2023

(51) Int. Cl.
G06F 11/36 (2006.01)
G06N 5/04 (2023.01)
G06N 20/00 (2019.01)

(52) U.S. Cl.
CPC ...... G06F 11/3688 (2013.01); G06F 11/3684 (2013.01); G06F 11/3696 (2013.01); G06N 5/04 (2013.01); G06N 20/00 (2019.01)

(58) Field of Classification Search
CPC .. G06F 11/3688; G06F 11/3696; G06N 20/00
(Continued)

(56) References Cited

U.S. PATENT DOCUMENTS

| | | | |
|---|---|---|---|
| 8,214,803 B2 * | 7/2012 | Horii ................ | G06F 11/3688 717/124 |
| 8,347,267 B2 * | 1/2013 | Givoni ............... | G06F 11/3664 717/124 |

(Continued)

FOREIGN PATENT DOCUMENTS

| | | |
|---|---|---|
| CN | 111444076 A | 7/2020 |
| CN | 111625468 A | 9/2020 |
| WO | 2021/034539 A1 | 2/2021 |

OTHER PUBLICATIONS

Khurshid, Sarfraz, and Darko Marinov. "TestEra: Specification-based testing of Java programs using SAT." Automated Software Engineering 11 (2004): pp. 403-434. (Year: 2004).*

(Continued)

*Primary Examiner* — Satish Rampuria
(74) *Attorney, Agent, or Firm* — Alston & Bird LLP

(57) ABSTRACT

Various embodiments are directed to performing automated software testing configuration management operations. In one embodiment, a method is provided. The method includes generating a graph data structure including nodes representing test steps across test cases of a software testing data object for a software application platform and including segments each connecting two nodes and representing test cases having the two represented test steps. The method further includes receiving a query describing a testing change and generating extracted features from the query. The method further includes generating test outcome requirements and graph portions of the graph data structure relevant to the testing change using supervised machine learning models and the extracted features. The method further includes generating, in response to the query, an updated graph data structure and a change report indicating the relevant test outcome requirements and performing prediction-based actions using the updated graph data structure and the change report.

20 Claims, 8 Drawing Sheets

(58) Field of Classification Search
USPC .................................................. 717/120–178
See application file for complete search history.

(56) References Cited

U.S. PATENT DOCUMENTS

| | | | |
|---|---|---|---|
| 8,898,639 | B2 | 11/2014 | Lawrance et al. |
| 9,430,591 | B2* | 8/2016 | Klinger ..................... G06F 8/70 |
| 9,779,013 | B2 | 10/2017 | Narayan et al. |
| 10,073,763 | B1 | 9/2018 | Raman et al. |
| 10,169,215 | B2 | 1/2019 | Anantharam et al. |
| 10,204,033 | B2 | 2/2019 | Simoni |
| 10,430,323 | B2 | 10/2019 | Raman et al. |
| 10,656,927 | B2 | 5/2020 | Hawrylo et al. |
| 10,678,682 | B2 | 6/2020 | Chauhan et al. |
| 10,747,651 | B1 | 8/2020 | Vanderwall et al. |
| 10,768,893 | B2 | 9/2020 | Misra et al. |
| 10,771,314 | B2 | 9/2020 | Misra et al. |
| 10,915,432 | B2 | 2/2021 | Hong et al. |
| 10,983,904 | B1 | 4/2021 | Sundararaman et al. |
| 11,080,171 | B2 | 8/2021 | Venkataraman et al. |
| 11,106,675 | B2 | 8/2021 | Balasubramanian et al. |
| 11,409,645 | B1* | 8/2022 | Zhang ................. G06F 11/3684 |
| 2017/0199810 | A1* | 7/2017 | Hamilton, II ....... G06F 11/3684 |
| 2019/0171553 | A1* | 6/2019 | Chauhan ................ G06N 5/022 |
| 2019/0278699 | A1* | 9/2019 | Sharma ................... G06F 9/451 |
| 2020/0175390 | A1 | 6/2020 | Conti et al. |
| 2020/0341888 | A1 | 10/2020 | Sridhar et al. |
| 2021/0027189 | A1 | 1/2021 | Alshawabkeh et al. |
| 2021/0263842 | A1 | 8/2021 | Sekhar et al. |
| 2021/0279577 | A1 | 9/2021 | West et al. |
| 2022/0188659 | A1* | 6/2022 | Krasnoslobodtsev ...................... G16H 70/40 |

OTHER PUBLICATIONS

Xie, Tao, D. Notkin, and D. Marinov. "Rostra: A framework for detecting redundant object-oriented unit tests." Proceedings. 19th International Conference on Automated Software Engineering, 2004 . . . IEEE, 2004.pp.1-10 (Year: 2004).*

Uzuncaova, Engin, Sarfraz Khurshid, and Don Batory. "Incremental test generation for software product lines." IEEE transactions on software engineering 36.3 (2010): pp. 309-322. (Year: 2010).*

Buehrer, Gregory, Bruce W. Weide, and Paolo AG Sivilotti. "Using parse tree validation to prevent SQL injection attacks." Proceedings of the 5th international workshop on Software engineering and middleware. 2005.pp. 106-113 (Year: 2005).*

Memon, Atif M., and Qing Xie. "Studying the fault-detection effectiveness of GUI test cases for rapidly evolving software." IEEE transactions on software engineering 31.10 (2005): pp. 884-896. (Year: 2005).*

Xu, Dianxiang, et al. "An automated test generation technique for software quality assurance." IEEE transactions on reliability 64.1 (2014): pp. 247-268. (Year: 2014).*

"Deduplicate Existing Test Cases," Broadcom, May 17, 2020, (3 pages), available online at https://techdocs.broadcom.com/us/en/ca-enterprise-software/devops/agile-requirements-designer/2-6/requirements-modeling/deduplicate-existing-test-cases.html.

Cheruiyot, Victor. "Machine Learning Driven Software Test Case Selection," Thesis, Concordia University of Edmonton, (Year: 2021), (51 pages), available online at https://era.library.ualberta.ca/items/1dceb556-55be-45c9-9da0-1e9edd2ef214/view/3631edd8-93d1-4592-89f7-c736790b69dc/2021_Summer_MScIT_Cheruiyot.pdf.

Ke, Wenjun et al. "Interpretable Test Case Recommendation Based On Knowledge Graph," In 2020 IEEE 20th International Conference on Software Quality, Reliability and Security (QRS), Dec. 11, 2020, pp. 489-496, IEEE, DOI: 10.1109/QRS51102.2020.00068.

Saddler, Jonathan. "EventFlowSlicer: A Goal-based Test Case Generation Strategy for Graphical User Interfaces," A Thesis, University of Nebraska-Lincoln, Aug. 2016, (141 pages).

Sharifara, Ali. "Graph-Based Testing CSE 5324," Heracleia Laboratory, pp. 1-42, available online at https://heracleia.uta.edu/~sharifara/5324/10_graph-testing.pdf.

Tahvili, Sahar et al. "Automated Functional Dependency Detection Between Test Cases Using Doc2Vec and Clustering," 2019 IEEE International Conference On Artificial Intelligence Testing (AITest), Apr. 4, 2019, pp. 19-26, DOI: 10.1109/AITest.2019.00-13.

* cited by examiner

MACHINE LEARNING TECHNIQUES FOR AUTOMATED SOFTWARE TESTING CONFIGURATION MANAGEMENT

BACKGROUND

The design of software testing modules, which primarily involves authoring, editing, and managing test cases, becomes increasingly difficult as the duration and scale of a project or application under test increases. In some examples, configuration data stored for software testing in its own regard requires a large amount of storage further to storage requirements of the project or application itself. Storage size required for software testing may in part include redundant test cases and test steps, causing storage-wise inefficiencies and non-optimality.

Further, technical challenges exist in designing new test cases and test steps that are not redundant with some existing test cases and test steps. With large test suites however, finding redundant test cases or test steps is a time and resource intensive task. Additionally, as the project or application under test evolves over time, certain existing test cases, test steps, and test requirements may be impacted by various changes; for example, a test case may become obsolete, irrelevant, or non-functional. Specific identification of impacted test cases, test steps, and test requirements is another time and resource intensive task that is also prone to errors. Various embodiments of the present disclosure address at least these technical challenges related to optimizing software testing configurations and to maintaining or managing a plurality of test cases in light of newly designed test cases and project changes.

BRIEF SUMMARY

In general, embodiments of the present disclosure provide methods, apparatus, systems, computing devices, computing entities, and/or the like for minimizing redundancy between a plurality of test cases and for identifying testing aspects impacted by external changes, such as project or application changes, changes involving a newly defined test step, and/or the like. In various embodiments, redundancy between the plurality of test cases and test steps is minimized through generation and analysis of a graph data structure that is configured to describe unique test steps belonging to the plurality of test cases. Each node of the graph data structure is configured to represent a unique test step, and a given test step can be compared to existing nodes of the graph data structure to determine a redundancy condition. Segments of the graph data structure are configured to represent different test cases, and test cases that traverse the same nodes of the graph data structure are determined to be redundant.

Meanwhile, supervised and unsupervised machine learning (ML) models may be used with the graph data structure to identify testing aspects impacted by external changes. Given input text provided by a user that describes a change to a testing domain (e.g., a project or application under test), a change to a test step, and/or the like, an unsupervised ML model configured for natural language processing and a supervised ML model are used to identify relevant portions of the graph data structure and to predict test cases, test requirements, and test modules associated with the relevant portions of the graph data structure, respectively.

In accordance with one aspect, a computer-implemented method for using a machine learning framework to perform automated software testing configuration management operations is provided. The computer-implemented method may include generating a graph data structure including a plurality of nodes each representing a test step belonging to one or more test cases of a software testing data object for a software application platform. The graph data structure further includes a plurality of segments each connecting two nodes and identifying a particular test case including two test steps represented by the two nodes. The computer-implemented method may further include receiving a test change query describing a testing change to the software testing data object. The computer-implemented method may further include generating one or more extracted features from the test change query using a natural language processing (NLP) ML model. The computer-implemented method may further include generating, based at least in part on the one or more extracted features, one or more test outcome requirements and one or more graph portions of the graph data structure relevant to the testing change using one or more supervised machine learning models. The computer-implemented method may further include, in response to the query, generating an updated graph data structure by modifying the one or more graph portions based at least in part on the one or more extracted features and generating a change report indicating the one or more test outcome requirements. The computer-implemented method may further include, in response to the query, performing one or more prediction-based actions based at least in part on the updated graph data structure and the change report.

In accordance with another aspect, a computer program product for using a machine learning framework to perform automated software testing configuration management operations is provided. The computer program product includes at least one computer-readable storage medium having computer-readable program code portions stored therein, and the computer-readable program code portions may include executable portions configured to cause at least one processor to generate a graph data structure including a plurality of nodes each representing a test step belonging to one or more test cases of a software testing data object for a software application platform. The graph data structure further includes a plurality of segments each connecting two nodes and identifying a particular test case including two test steps represented by the two nodes. The computer-readable program code portions may further include executable portions configured to cause at least one processor to receive a test change query describing a testing change to the software testing data object. The computer-readable program code portions may further include executable portions configured to cause at least one processor to generate one or more extracted features from the test change query using a natural language processing (NLP) ML model. The computer-readable program code portions may further include executable portions configured to cause at least one processor to generate, based at least in part on the one or more extracted features, one or more test outcome requirements and one or more graph portions of the graph data structure relevant to the testing change using one or more supervised machine learning models. The computer-readable program code portions may further include executable portions configured to cause at least one processor to, in response to the query, generate an updated graph data structure by modifying the one or more graph portions based at least in part on the one or more extracted features and generate a change report indicating the one or more test outcome requirements. The computer-readable program code portions may further include executable portions configured to cause at least one processor to perform, in response to the query, one or more prediction-based actions based at least in part on the updated graph data structure and the change report.

In accordance with yet another aspect, an apparatus for using a machine learning framework to perform automated software testing configuration management operations is provided. The apparatus includes a processor and at least one memory including computer program code is provided. The at least one memory and the computer program code may be configured to, with the processor, cause the apparatus to generate a graph data structure including a plurality of nodes each representing a test step belonging to one or more test cases of a software testing data object for a software application platform. The graph data structure further includes a plurality of segments each connecting two nodes and identifying a particular test case including two test steps represented by the two nodes. The at least one memory and the computer program code may be configured to, with the processor, cause the apparatus to receive a test change query describing a testing change to the software testing data object. The at least one memory and the computer program code may be configured to, with the processor, cause the apparatus to generate one or more extracted features from the test change query using a natural language processing (NLP) ML model. The at least one memory and the computer program code may be configured to, with the processor, cause the apparatus to generate, based at least in part on the one or more extracted features, one or more test outcome requirements and one or more graph portions of the graph data structure relevant to the testing change using one or more supervised machine learning models. The at least one memory and the computer program code may be configured to, with the processor, cause the apparatus to, in response to the query, generate an updated graph data structure by modifying the one or more graph portions based at least in part on the one or more extracted features and generate a change report indicating the one or more test outcome requirements. The at least one memory and the computer program code may be configured to, with the processor, cause the apparatus to perform, in response to the query, one or more prediction-based actions based at least in part on the updated graph data structure and the change report.

BRIEF DESCRIPTION OF THE DRAWINGS

Having thus described the invention in general terms, reference will now be made to the accompanying drawings, which are not necessarily drawn to scale.

Figure 1A:
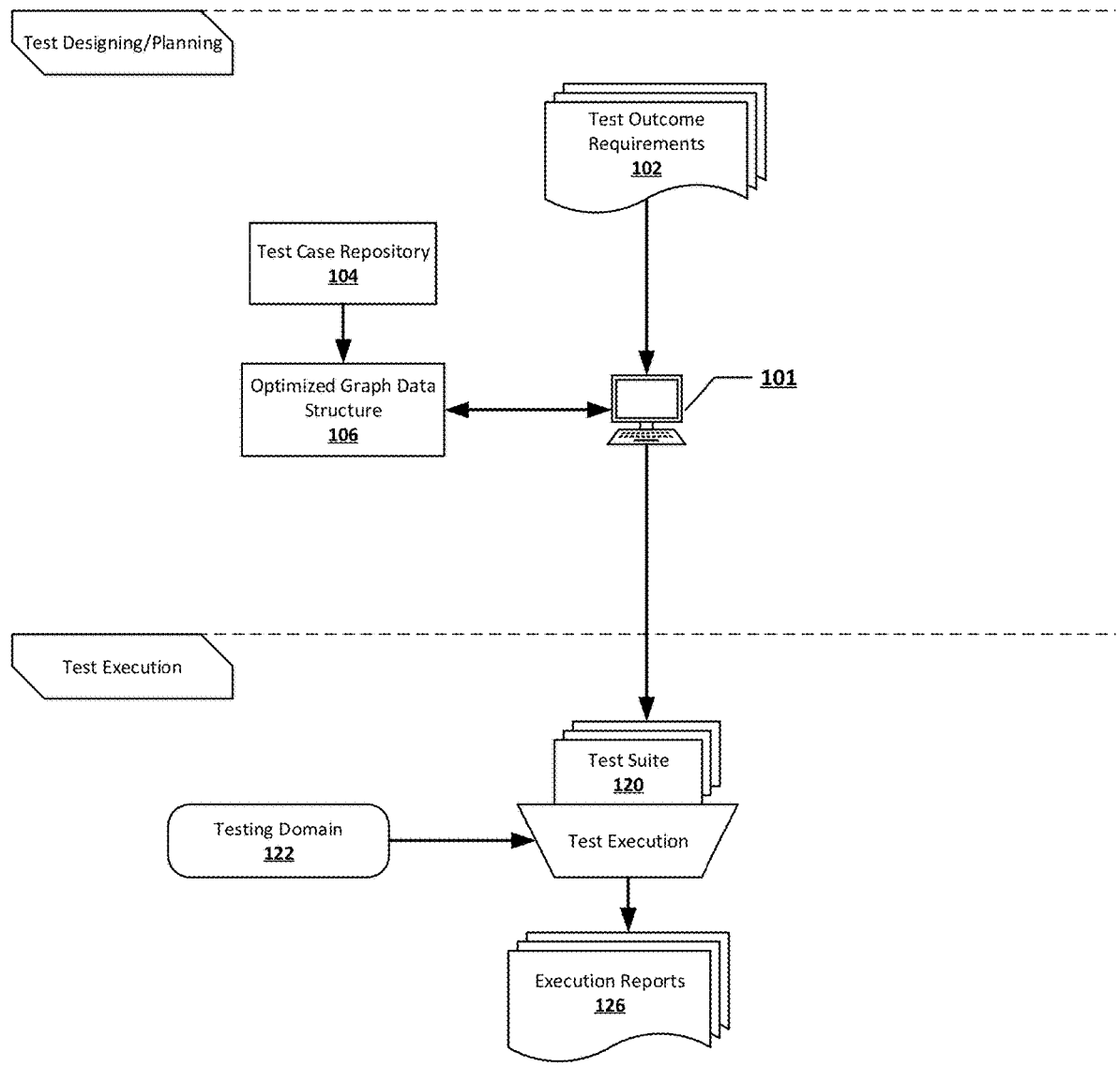

FIG. 1A provides an overview of a testing workflow within which embodiments of the present disclosure may be practiced.

Figure 1B:
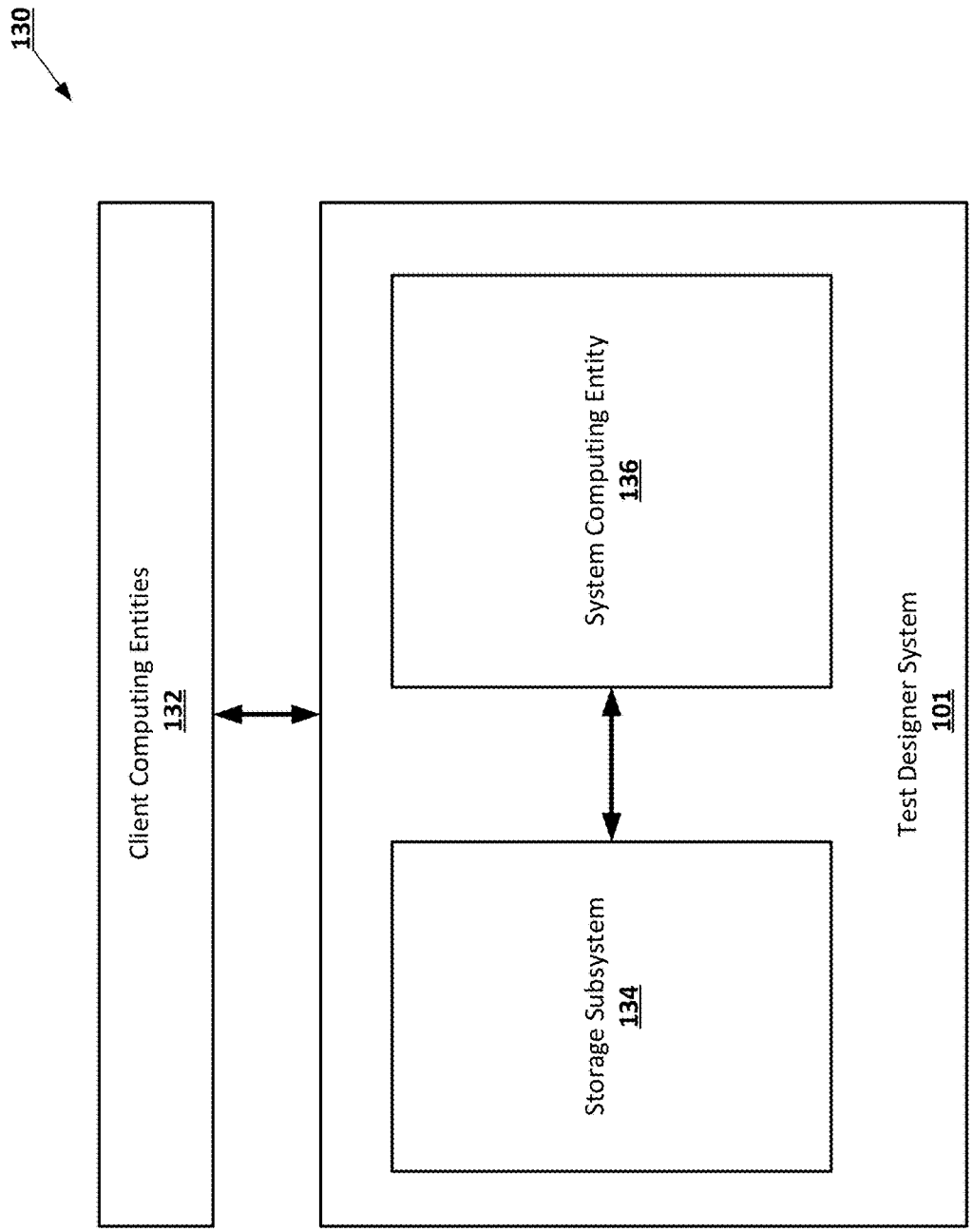

FIG. 1B provides an exemplary overview of an architecture that may be used to practice embodiments of the present disclosure.

Figure 2:
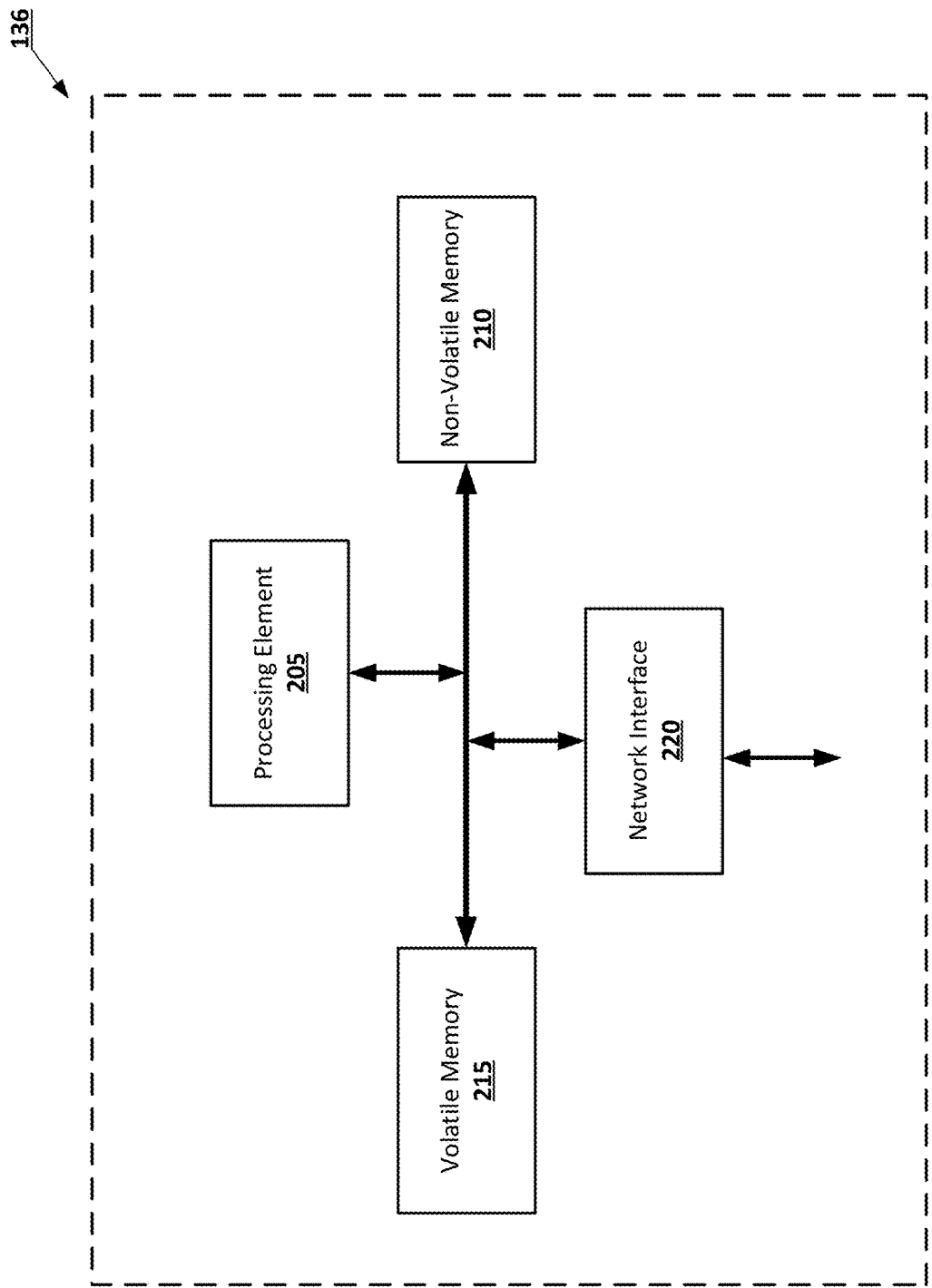

FIG. 2 provides a diagram of an example system computing entity, in accordance with some embodiments discussed herein.

Figure 3:
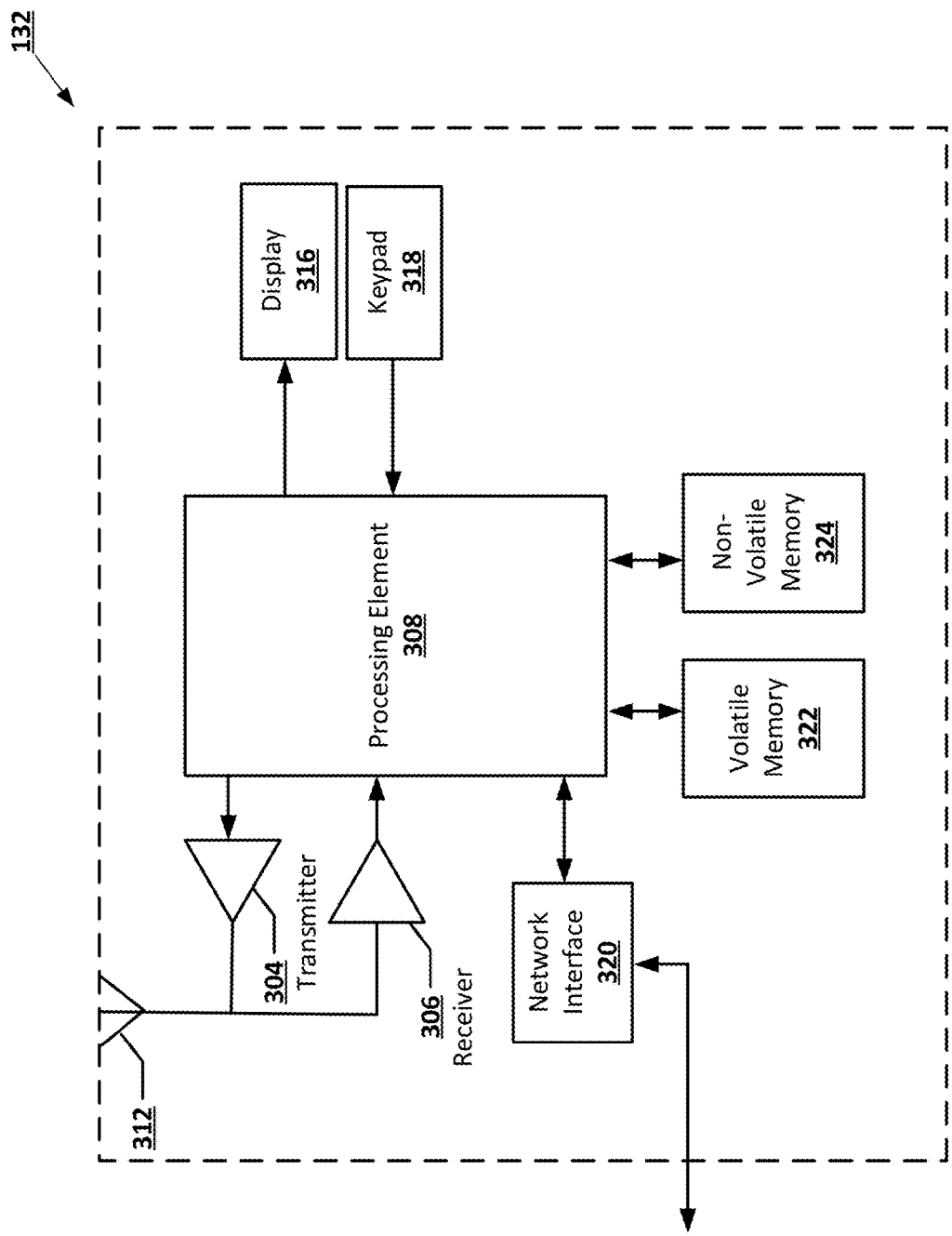

FIG. 3 provides a diagram of an example client computing entity, in accordance with some embodiments discussed herein.

Figure 4:
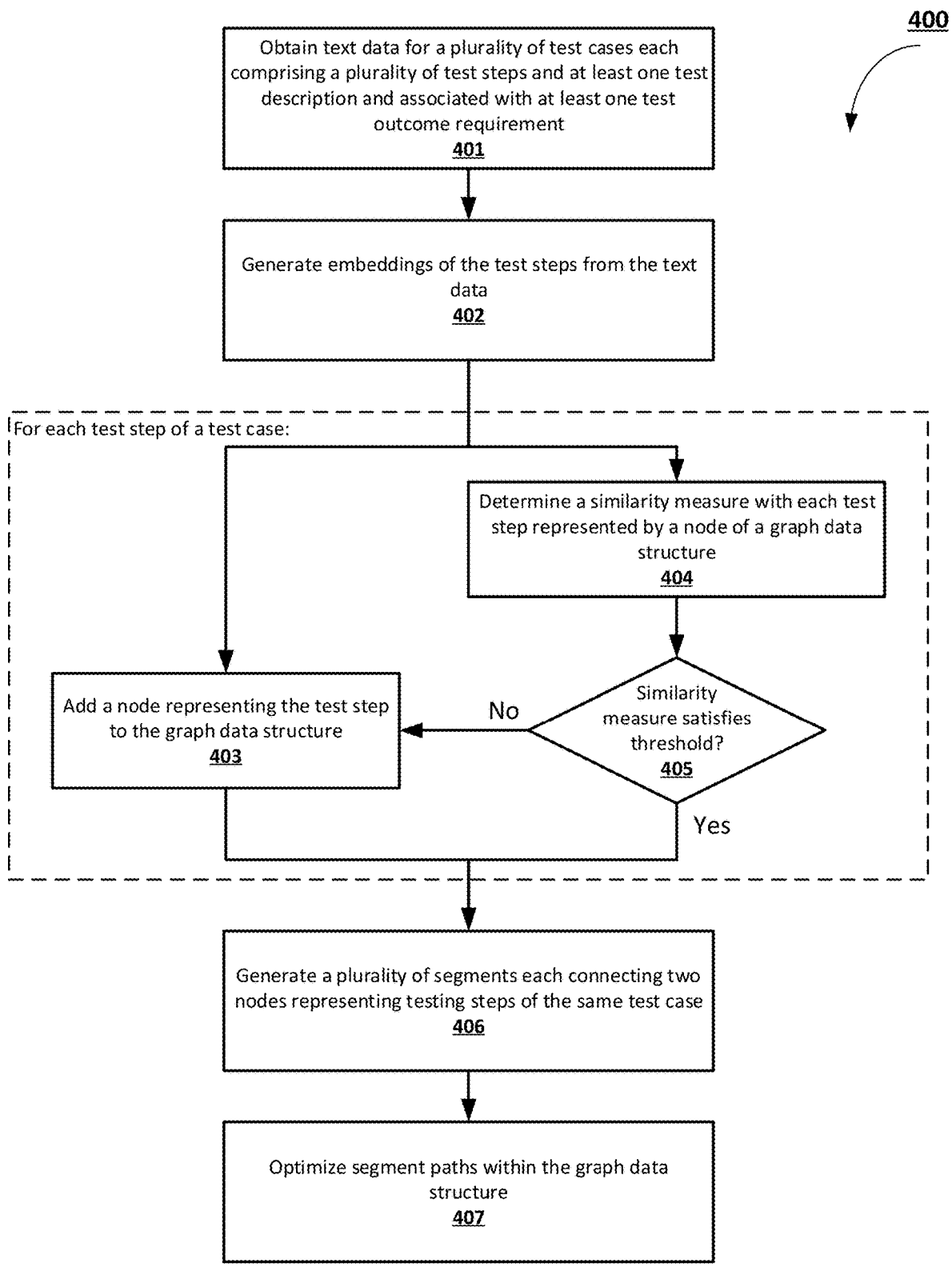

FIG. 4 illustrates a flowchart diagram of an example process for generating a graph data structure for managing a plurality of test cases and test steps, in accordance with some embodiments discussed herein.

Figure 5:

FIG. 5 illustrates an example graph data structure used to manage a plurality of test cases and test steps, in accordance with some embodiments discussed herein.

Figure 6:
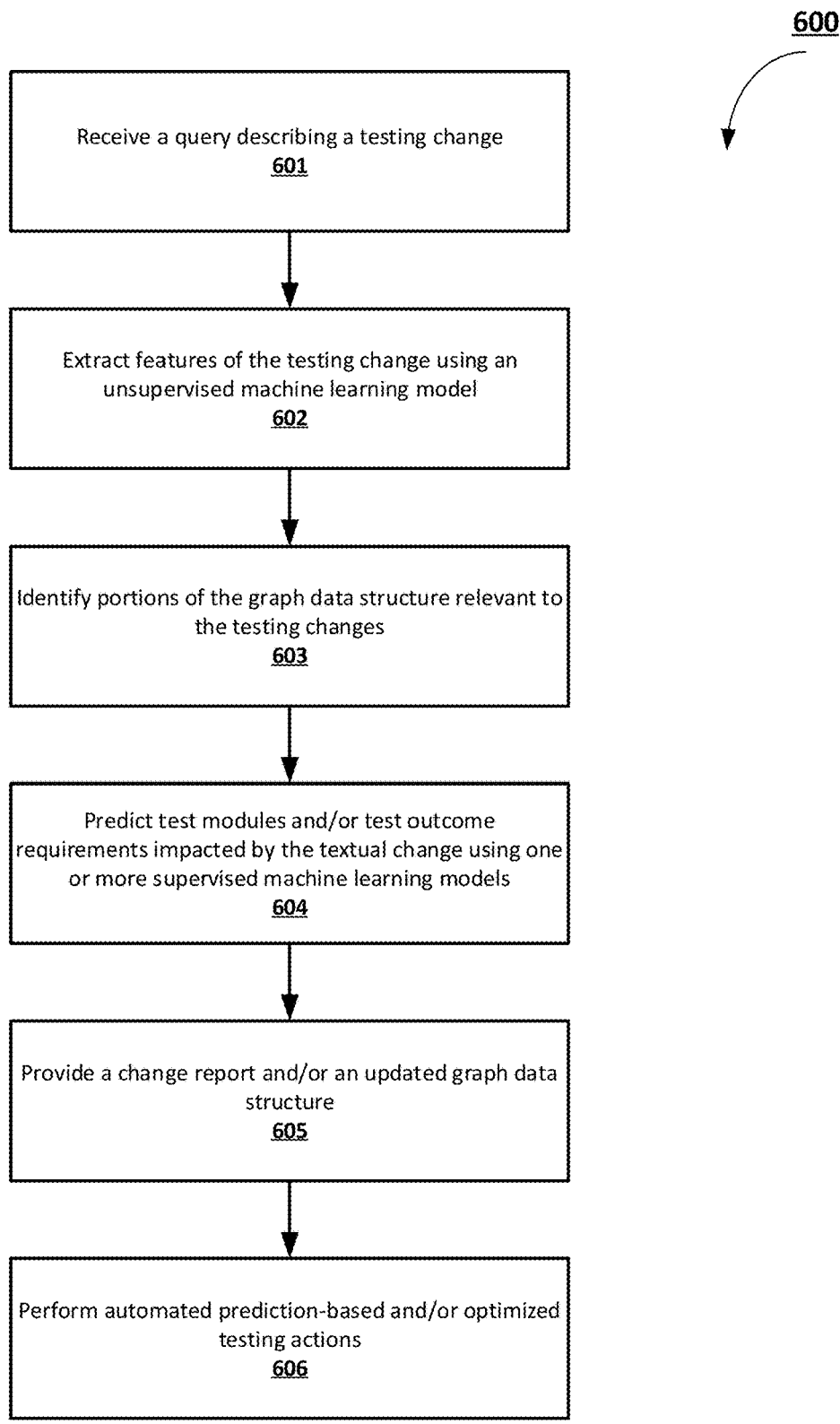

FIG. 6 illustrates a flowchart diagram of an example process for providing a change report describing testing aspects impacted by an external change, in accordance with some embodiments discussed herein.

Figure 7:
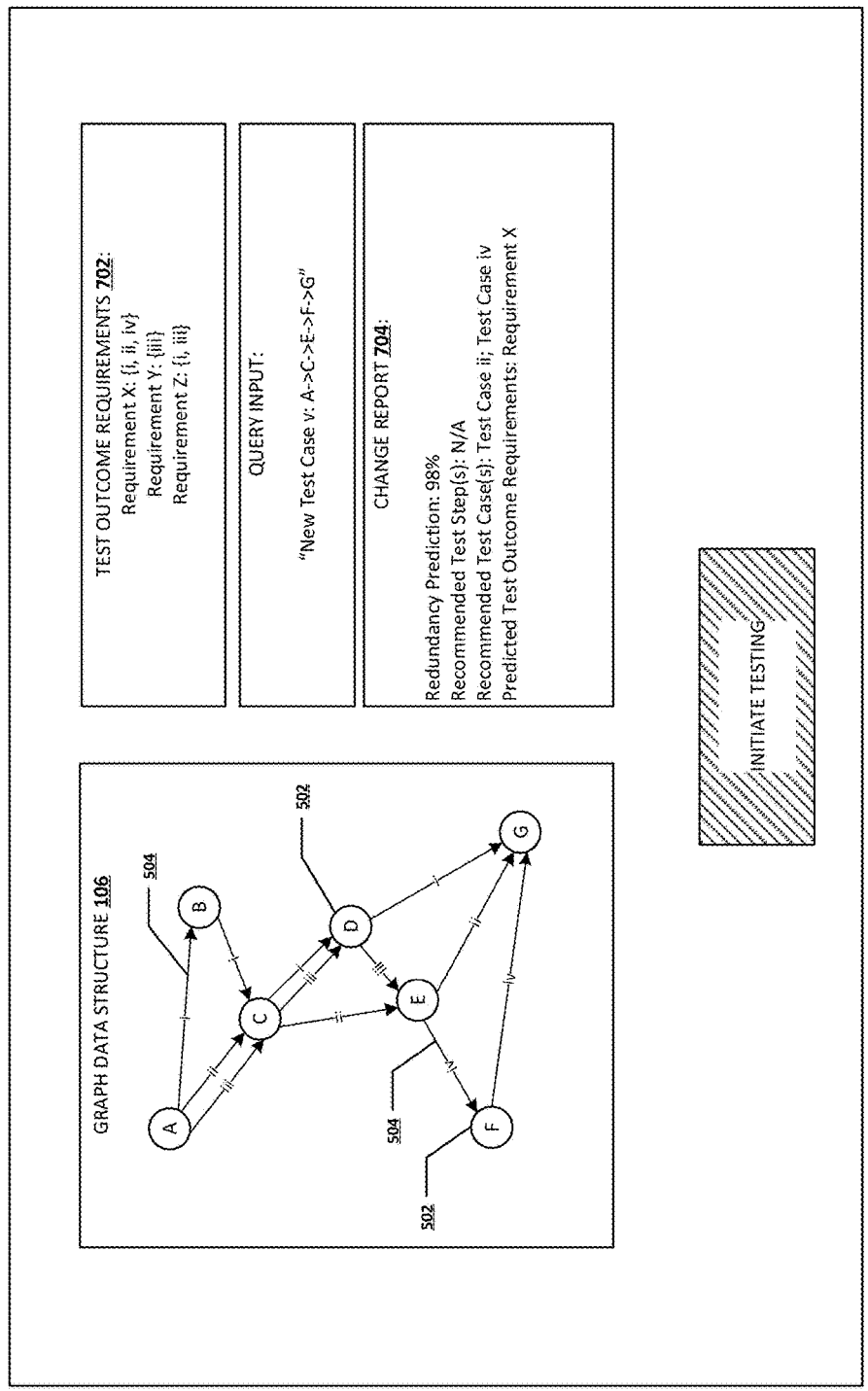

FIG. 7 illustrates an example user interface provided for various prediction-based actions, in accordance with some embodiments discussed herein.

DETAILED DESCRIPTION

Various embodiments of the present disclosure now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to providing text-based summarizations of conversations, one of ordinary skill in the art will recognize that the disclosed concepts can be used in other summarization and/or text extraction applications.

I. Overview and Exemplary Technical Improvements

Various embodiments of the present disclosure are generally directed to minimizing redundancy between a plurality of test cases and test steps and to managing the evolution and change of the test cases and test steps. Example embodiments described herein provide intelligence in test designing and planning for projects, applications, and testing domains of large durations and scales.

With large-scale testing domains and accompanying large-scale test case repositories, it is likely that a user may inadvertently and erroneously write redundant test cases or redundant test steps, or otherwise define and operate under redundant test outcome requirements or objects. As a result, test execution time may be increased, leading to an overall decrease in testing efficiency, and computational resources dedicated to performing test cases may be unnecessarily wasted. Manual and non-intelligent efforts to search for redundant test cases or test steps may similarly require large amounts of computational resources and time, especially given that many test cases and test steps are defined by text in a natural language form and may generally be unstructured text. For instance, different words, sentence structure, syntax, and errors may appear in different test cases and test steps. Even further, it is also difficult in large test case repositories to maintain a record of different associations and redundancies between test cases, further expending unnecessary computational resources and time.

Further technical challenges arise with the test design process generally involving the evolution, re-designing, and changing of various testing aspects, including test cases, test steps, test outcome requirements, the testing domain itself, and/or the like. One particular change may have far-reaching effects within the testing environment; for example, multiple test cases may be affected and impacted by the one particular change. In such instances, identifying and appropriately handling each respective testing aspect that is impacted by each change or update is a tedious, expensive, and error prone task. Such a change accommodation task has high impacts as well, as even one undetected test case that is impacted by a change may lead to wasted time and effort later in test execution and analysis.

Thus, various embodiments provide technical solutions and improvements to at least these described challenges. Generally, various embodiments provide solutions that leverage both graph data structures that represent pluralities of test cases and machine learning models that identify and/or predict change impacts throughout the testing environment, and such solutions reduce computational resources and time spent to create, filter, and update test cases during test designing. As such, for example, various embodiments may be applied and used in long running projects having thousands of test cases in order to efficiently and intelligently locate redundancies and to enable filtering and update of affected test cases in the event of project changes.

In various embodiments, data defining test cases is analyzed, pre-processed, and then modelled as a graph data structure having nodes that represent individual and unique test steps and having segments or edges that represent test cases involving test steps represented by the connected nodes. The graph data structure is optimizable such that redundancies on both a test step level and a test case level may be minimized. Specifically, unsupervised machine learning models having natural language processing functionality can be used to identify and remove redundant test steps within the graph data structure. Various embodiments further provide reports and recommendations generated using supervised machine learning models that identify impacted test cases or modules and/or impacted test outcome requirements in response to a change being specified. Thus, various embodiments provide technical effects related to computational efficiency, operational reliability, and operational throughput of test designing and test execution systems.

Various embodiments of the present disclosure address technical challenges related to reducing the amount of configuration data stored for software testing data objects that describe configuration data associated with software testing modules. The storage size of a software testing data object correlates with the number of test steps described by the software testing data object. In some embodiments, by automatically removing redundant test steps and test cases in accordance with the techniques described herein, various embodiments of the present invention reduce the storage size of software testing data objects and improve storage-wise efficiency of automated software testing platforms.

II. Exemplary Definitions of Certain Terms

The term "test case" may refer to a data entity configured to specify a test within a testing domain in order to verify certain aspects or functionality of the testing domain. Generally, a test case may be performed in an automated or a manual manner, and results of the performance of the test case are used to analyze the tested aspect or functionality of the testing domain. A test case can be defined as a sequence of test steps that are performed within the testing domain, and performance of the sequence of test steps may result in a particular value, a particular state of the testing domain, and/or the like. The test case can be further defined to include at least one test outcome requirement against which such results can be compared. Test cases are identifiable and referenced by a unique identifier, a name or title, and/or the like. In various examples, a test case may be associated with a test module, which is a data entity configured to describe a family or cohort of test cases. For instance, test cases of a test module may have been defined together by one user, may be directed to testing a particular aspect or functionality of a testing domain, may be associated with the same test outcome requirements, may involve a number of common test steps, and/or the like. A test case may further include a test description that generally describes the objectives and methods of the test case. In various examples, a test case is defined at least in part through text in the form of natural language. A test case may be in the form of an array, a matrix, a container, a data structure, and/or the like. In some embodiments, one or more test cases are defined within a software testing data object associated with a testing domain (e.g., a software application platform having software modules). A software testing data object generally describes configuration data associated with various test cases.

The term "testing domain" may refer to an environment within which test cases are performed and having aspects and functionalities that are tested by the test cases. For example, a testing domain may be a software project or an application being tested, such as a web and/or application portal, a website, a program having inputs and/or outputs, and/or the like. A testing domain may be interactable or responsive to an extent such that various test steps may be performed to elicit a response, a transformation, an action, an output, and/or the like from the testing domain.

The term "test step" may refer to a data entity describing an action or operation that is performed (e.g., automatically, manually) within a testing domain. Performance of the test step may elicit a response (e.g., a transformation, an action, an output) from the testing domain. At least one test step may belong to a test case, and multiple test steps of a test case may have a particular sequence or order. In some examples, a test step may be dependent upon the prior performance of another test step. A test step is defined at least in part through text in the form of natural language. In some examples, a test step may be associated with various parameters, values, and/or the like. To list some illustrative and non-limiting examples, a test step may be: click the button labelled "submit", or input X value into the first field. As test steps may involve natural language text, different test steps may describe the same action or operation. For instance, a first test step that is click the button labelled "submit" and a second test step that is interact with the "submit" button may conceptually refer to the same action and may be redundant. Various embodiments of the present disclosure provide for identification of redundant test steps and representation of unique test steps within a graph data structure.

The term "graph data structure" may refer to a data entity configured to represent a plurality of test cases and their test steps. The graph data structure generally includes a plurality of nodes and a plurality of segments connecting each node. Specifically, each segment spans between and connects two different nodes. In various embodiments, each node of the graph data structure is configured to represent a test step belonging to one or more of the plurality of test cases, and the plurality of nodes of the graph data structure together represent unique test steps across the plurality of test cases. That is, a test step represented by a given node may be involved in multiple test cases as a common test step. For instance, multiple test cases related to a specific aspect (e.g., a button in a web portal) and/or functionality of the testing domain may include various versions or forms of a common test step (e.g., interacting said button). Meanwhile, each segment of the graph data structure is configured to represent and identify a test case having the test steps represented by the two connected nodes. Accordingly, a test case and its test steps can be represented by a traversable path made of one or more segments connecting a plurality of test steps. The graph data structure may then visualize redundant test cases, as such redundant test cases are indicated by parallel segments traversing the same or similar nodes in a same or similar sequential order.

The term "supervised machine learning model" may generally refer to a data entity configured to generate a prediction related to an input based at least in part on configurable weights or parameters used to interpret the input, in certain embodiments. According to various embodiments described herein, one or more supervised machine learning models are used to predict testing aspects that are impacted by or relevant to a change described by input text. In some examples, supervised machine learning models may be understood as classification models, and for example, a supervised machine learning model may classify input text as pertaining to a specific test outcome requirement, standardized test description, or a test module (e.g., a family or cohort of test cases). In various embodiments, supervised machine learning models may be used to predict the most relevant test outcome requirements for a test case, for a test description, and/or for a test module, and likewise may be used to predict the most relevant test modules for a test outcome requirement, thereby providing intelligent assistance in test designing and planning. Supervised machine learning models may be configured using supervised or semi-supervised learning techniques and may accordingly use historical and/or labelled data, such as data describing relationships between existing test cases, test outcome requirements, test modules, and/or the like.

The term "module identification machine learning model" may refer to a data entity configured to predict and identify relevant test modules for a test change query. For example, a test change query may describe a new test case and/or test step, and the module identification machine learning model may predict and recommend one or more test modules for which the new test case and/or test step may be used. In various embodiments, the module identification machine learning model is a supervised machine learning model; that is, the module identification machine learning model may be trained in a supervised manner to predict one or more relevant test modules using historical ground-truth and/or labelled data. In various embodiments, the module identification machine learning model generates its inferences (e.g., predicted test modules of relevance) in response to receiving input data, and in particular, input data for the module identification machine learning model may include a set of extracted natural language features of a test change query. Accordingly, the historical ground-truth and/or labelled data used to train the module identification machine learning model may include sets of natural language features that are labelled with ground-truth relevant test modules, for example. In various embodiments, the module identification machine learning model includes one or more transformer components, attention components, recurrent neural network components, and/or the like for processing a set of natural language features which may have a sequential order or meaning. In various embodiments, the module identification machine learning model is configured to reference the graph data structure in analyzing its input data, and accordingly may use a graph convolutional neural network component, in some examples. Similarly, the module identification machine learning model may be configured to traverse the graph data structure to identify test modules associated with graph portions similar to the test change query. With its predictive output, the module identification machine learning model may further provide a probability, confidence, weight, and/or the like associated with the output. In an example, the module identification machine learning model outputs probabilities of relevance for each of a pre-defined plurality of possible test modules, and certain test modules are taken as the output of the module identification machine learning model based at least in part on their associated probabilities. In some embodiments, the inputs to the module identification machine learning model comprise a vector describing one or more extracted features of a test change query and a vector describing the target module subset for the test change query, while the outputs of the requirement identification machine learning model comprise a vector describing an inferred likelihood for each module of m test requirements.

The term "requirement identification machine learning model" may refer to a data entity configured to predict relevant test outcome requirements for a test change query. For example, a test change query may describe a new test case and/or test step, and the requirement identification machine learning model may predict and recommend one or more test outcome requirements that may pertain to the new test case and/or test step. As such, additional user effort to explicitly write and define test outcome requirements for each added test case/step is reduced, and further, prediction and recommendation of test outcome requirements for each test case/step results in standardization of the test outcome requirements across multiple test cases/steps and within a software testing data object. In various embodiments, the requirement identification machine learning model is a supervised machine learning model; that is, the requirement identification machine learning model may be trained in a supervised manner to predict one or more relevant test outcome requirements using historical ground-truth and/or labelled data. In various embodiments the module identification machine learning model generates its inferences (e.g., predicted test outcome requirements of relevance) in response to receiving input data, and in particular, input data for the requirement identification machine learning model may include a set of extracted natural language features of a test change query. Accordingly, the historical ground-truth and/or labelled data used to train the requirement identification machine learning model may include sets of natural language features that are labelled with ground-truth relevant test outcome requirements, for example. In various embodiments, the requirement identification machine learning model includes one or more transformer components, attention components, recurrent neural network components, and/or the like for processing a set of natural language features that may have a sequential order or meaning. In various embodiments, the requirement identification machine learning model includes a graph convolutional neural network component for analyzing a state of the graph data structure and related data. The requirement identification machine learning model may be similarly configured for graph traversal of the graph data structure in order to discover test outcome requirements previously associated with graph portions of the graph data structure. In various embodiments, the requirement identification machine learning model is configured to determine a probability or confidence for each of a pre-defined plurality of possible test outcome requirements, and the inference output of the requirement identification machine learning model is based at least in part on a selection of test outcome requirements according to their associated probabilities or confidences. In some embodiments, the inputs to the requirement identification machine learning model comprise a vector describing one or more extracted features of a test change query, while the outputs of the requirement identification machine learning model comprise a vector describing an inferred likelihood for each module of n modules of a corresponding software application framework.

The term "unsupervised machine learning model" may generally refer to a data entity configured to learn information and to obtain understanding of data, in certain embodiments for example. According to various embodiments described herein, an unsupervised machine learning model may be used to generate embeddings or representations of data, which can then be used to further process and analyze the data. In particular, an unsupervised machine learning model may be used to generate embeddings or representations of text describing test steps to enable quantitative comparison of test steps. In certain applications discussed in the context of the various embodiments of the present disclosure, unsupervised machine learning models may be used in natural language processing tasks to represent, process, and analyze text in its natural language form. Generally, unsupervised machine learning models may be configured using unsupervised learning techniques and may accordingly use non-labelled data.

The term "similarity measure" may refer to a data entity configured to quantitatively describe a similarity between two test steps. As discussed, test steps may be defined using text in a natural language form, and accordingly, each test step may be represented using embeddings of respectively extracted features. Accordingly, quantification of the similarity, or conversely the difference, between two test steps can be determined through embeddings or representations of the two test steps. In various embodiments, a similarity measure between two test steps is a cosine-based similarity value determined using embeddings or representations of two test steps.

The term "change report" may refer to a data entity configured to describe predictive analysis related to a specified external and testing-related change. In various examples, a change report may be provided in response to a user inputting text describing a change. Example changes may include an addition of a test step, an addition of a test case, and/or an addition of a test outcome requirement, and a change report generated and provided in response may indicate recommendations of existing test steps, test cases, and/or test outcome requirements that may be similar and may cause some redundancy. Further example changes may include a modification to a testing domain (e.g., addition of a new feature, removal of an aspect or functionality being tested), and a change report generated and provided in response may indicate existing test steps, test cases, and/or test outcome requirements that may be rendered moot or irrelevant and/or that may require accommodating and corresponding changes. In various embodiments, such testing aspects that may be rendered moot or irrelevant are predicted and identified using one or more supervised machine learning models. A change report may be an array (e.g., of identifiers for test cases predicted to be impacted by a change), a matrix, a vector, a data structure, embeddings (e.g., probabilities or weights that certain testing aspects are impacted by a change), and/or the like.

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

As discussed, various embodiments of the present disclosure generally relate to identifying and minimizing redundancies in and between test cases and to managing changes related to the test cases, such as by identifying testing aspects impacted by a textually-defined change. FIG. 1A is a diagram generally illustrating a testing workflow or architecture within which various embodiments described herein may be applied. As illustrated, the testing workflow or architecture includes two primary stages: test designing or planning, and test execution. In various examples, test cases and aspects thereof (e.g., test steps, test descriptions, test outcome requirements) may be designed and planned prior to their execution. Further, an entire library, repository, suite, and/or the like of test cases may be designed and planned before the test cases are executed.

In particular, various aspects of the present disclosure may be embodied within the test designing or planning stage of a testing workflow/architecture in order to identify redundancies between test cases and test steps and in order to predict impacts of changes being made to the testing domain, to various test cases, to specific test steps, and/or the like during the test designing/planning stage. In various embodiments, a test designer system 101 is configured to perform operations for at least these redundancy-identifying and impact-predicting functions. With the test designer system 101, the exemplary technical improvements and technical effects discussed herein may be realized throughout the testing workflow/architecture, such as by conserving computational resources in test designing and/or by improving the efficiency of test execution.

As illustrated, the design and planning of testing may require test outcome requirements 102 that generally specify the aspects or functionalities to be tested. In various embodiments, the test outcome requirements 102 are provided to the test designer system 101 in the form of natural language text. For instance, a test outcome requirement 102 may be defined as: the web portal should display X value after button A is clicked. Accordingly, at least test outcome requirements 102 may be used to design, plan, and identify test cases.

The test outcome requirements 102 are associated with a test case repository 104, and specifically with test cases of the test case repository 104 that can be performed to verify the test outcome requirements 102. The test case repository 104 generally may identify a plurality of test cases associated with a given testing domain. In some examples, the test case repository 104 may include some organization or configuration of test cases. For instance, the test case repository 104 may include one or more test modules which may be a family or cohort of similar test cases, such as test cases testing a given aspect or functionality of the given testing domain or test cases involving one or more similar or the same test steps. That is, a test case may belong to a test module of the test case repository 104. The test case repository 104 may be represented by a graph data structure 106 that is generated and optimized to minimize redundancies within the test case repository 104. In various embodiments, the graph data structure 106 is generated by the test designer system 101.

Using the graph data structure 106, the test designer system 101 may additionally enact changes or modifications to existing test cases (and test steps thereof) of the test case repository 104 as well as add new test cases and test steps. Thus, in various embodiments, the graph data structure 106 enables dynamic modification of the test case repository 104. Further, the test designer system 101 is configured to analyze the graph data structure 106 representing the test case repository 104 in view of the test outcome requirements 102. Equipped with both the graph data structure 106 and the test outcome requirements 102, the test designer system 101 is configured to identify test outcome requirements 102 that may be impacted by changes being made to the test case repository 104 (e.g., modification, addition, and/or removal of test cases/steps) and is similarly configured to identify test cases/steps that may be impacted by changes being made to the test outcome requirements 102. Accordingly, a user of the test designer system 101 is provided with comprehensive information and capabilities for configuration of test cases and test outcome requirements 102 for later execution.

Thus, using the test designer system 101, a test suite 120 of test cases selected for execution can then be executed with minimized redundancies between said test cases. As discussed, the test suite 120 may be executed in an automated manner using one or more scripts generated from the test cases and/or manually by a user. In any regard, the test suite 120 is executed within the testing domain 122, in which the test cases are configured to cause certain responses, transformations, actions, outputs, and/or the like. Accordingly, during test execution of the test suite 120, various results or responses of the testing domain 122 may be recorded and analyzed with respect to the test outcome requirements 102. With the previously discussed example of a test outcome requirement 102, analysis may include determining whether the web portal displayed a value and determining whether a displayed value was the expected value, for example. From this analysis, one or more execution reports 126 can be generated and provided to a user, who may then make further changes or modifications to the testing domain 122 itself, to the test outcome requirements 102, and/or to the test cases/steps. Further changes or modifications can again be indicated to or specified within the test designer system 101, and as before, the test designer system 101 is configured to identify and indicate impacted testing aspects to the user.

Referring now to FIG. 1B, a schematic diagram of an example system architecture 130 for test designing or planning is provided. For instance, the system architecture 130 may be configured for identification and minimization of redundancies within a test case repository 104 and for analysis of impacts of test design changes. The system architecture 130 includes the test designer system 101, which as previously described is configured to minimize redundancies within a test case repository 104 and to identify impacted testing aspects (e.g., test cases/steps, test outcome requirements) in light of indicated test design changes.

As illustrated, the system architecture 130 may include one or more client computing entities 132, which may be in communication with the test designer system 101. In various examples, a client computing entity 132 is an external system that the test designer system 101 may communicate with during test designing/planning and/or test execution. In one example, a client computing entity 132 may be a personal device associated with a user, and the test designer system 101 may receive input text from the client computing entity 132, with the input text describing a new test case/step, a new test outcome requirement 102, changes to existing test cases/steps, changes to test outcome requirements 102, changes to the testing domain, and/or the like. In various such examples, the test designer system 101 may provide a change report to the client computing entity 132 indicating that various changes were made (e.g., the addition of a test case/step) and/or indicating various test cases/steps and test outcome requirements 102 impacted by a described change.

In various examples, the client computing entity 132 may be a system or platform hosting the testing domain and upon which the test suite 120 may be performed. Accordingly, the test designer system 101 may be configured to provide the test suite 120 (and/or scripts for executing the test suite 120) to the client computing entity 132 for execution.

In various embodiments, the test designer system 101 may communicate with at least one of the client computing entities 132 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The test designer system 101 may include a system computing entity 136 and a storage subsystem 134. The system computing entity 136 may be configured to perform various operations described herein to minimize test case/step redundancies and to identify impacted testing aspects in response to specified changes. For instance, the system computing entity 136 is configured to perform various operations related to generating a graph data structure representing a plurality of test cases and test steps thereof, optimizing the graph data structure by removing redundant test cases, analyzing input text describing a change using an unsupervised ML model, and predicting impacted testing aspects using one or more supervised ML models.

In various embodiments, the system computing entity 136 may be a cloud-based computing system including one or more computing devices each configured to share and allocate computer processing resources and data, in some examples. In other example embodiments, the system computing entity 136 may be a distributed computing system, one or more devices in an edge computing architecture, and/or the like.

The storage subsystem 134 may be configured to store certain data for test designing/planning and for enabling certain operations performed by the system computing entity 136, or the test designer system 101 generally. For instance, in example embodiments, the storage subsystem 134 stores data for a test case repository 104 (e.g., text data), a graph data structure representing the test case repository 104, one or more unsupervised machine learning models for analyzing text and natural language features for the input text and/or stored data (e.g., the test case repository 104, one or more test outcome requirements 102), one or more supervised machine learning model for predicting change impacts, and/or the like.

The storage subsystem 134 may include one or more storage units, such as multiple distributed storage units that are connected through a computer network. Each storage unit in the storage subsystem 134 may store at least one of one or more data assets and/or one or more data about the computed properties of one or more data assets. Moreover, each storage unit in the storage subsystem 134 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Computing Entities

In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, settop boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

FIG. 2 provides a schematic of a system computing entity 136, according to one embodiment of the present disclosure. As shown in FIG. 2, in one embodiment, the system computing entity 136 may include, or be in communication with, one or more processing elements 205 (also referred to as processors, processing circuitry, and/or similar terms used herein interchangeably) that communicate with other elements within the system computing entity 136 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the system computing entity 136 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media 210 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the system computing entity 136 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the system computing entity 136 with the assistance of the processing element 205 and operating system.

As indicated, in one embodiment, the system computing entity 136 may also include one or more network interfaces 220 for communicating with various computing entities (e.g., one or more other system computing entities 136, one or more client computing entities 132), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system computing entity 136 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the system computing entity 136 may include, or be in communication with, one or more input elements, such as a keyboard input, a mouse input, a touch screen/display input, motion input, movement input, audio input, pointing device input, joystick input, keypad input, and/or the like. The system computing entity 136 may also include, or be in communication with, one or more output elements (not shown), such as audio output, video output, screen/display output, motion output, movement output, and/or the like.

FIG. 3 provides a schematic of an example client computing entity 132 that may be used in conjunction with embodiments of the present disclosure. Client computing entities 132 can be operated by various parties, and the system architecture 130 may include one or more client computing entities 132. Within the system architecture 130, client computing entities 132 may be and/or may be components of external systems at which users may provide input text describing testing changes and may receive change reports from the test designer system 101, or external systems configured to execute select test cases for test execution.

As shown in FIG. 3, the client computing entity 132 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 132 may be capable of operating with one or more air interface standards, communication protocols, modulation types, and access types. More particularly, the client computing entity 132 may operate in accordance with any of a number of wireless communication standards and protocols, such as those described above with regard to the system computing entity 136. In a particular embodiment, the client computing entity 132 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 132 may operate in accordance with multiple wired communication standards and protocols, such as those described above with regard to the system computing entity 136 via a network interface 320.

Via these communication standards and protocols, the client computing entity 132 can communicate with various other entities (e.g., system computing entities 136, storage subsystem 134) using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 132 can also download changes, add-ons, and updates, for instance, to its firmware, software (e.g., including executable instructions, applications, program modules), and operating system.

According to one embodiment, the client computing entity 132 may include location determining aspects, devices, modules, functionalities, and/or similar words used herein interchangeably. For example, the client computing entity 132 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like.

Alternatively, the location information/data can be determined by triangulating the position of the client computing entity 132 in connection with a variety of other systems, including cellular towers, Wi-Fi access points, and/or the like. Similarly, the client computing entity 132 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 132 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 132 to interact with and/or cause display of information/data from the system computing entity 136, as described herein. The user input interface can comprise any of a number of devices or interfaces allowing the client computing entity 132 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 132 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 132 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 132. As indicated, this may include a user application that is resident on the entity or accessible through a browser or other user interface for communicating with the system computing entity 136, various other computing entities, and/or a storage subsystem 134.

In another embodiment, the client computing entity 132 may include one or more components or functionality that are the same or similar to those of the system computing entity 136, as described in greater detail above. As will be recognized, these architectures and descriptions are provided for exemplary purposes only and are not limiting to the various embodiments.

In various embodiments, the client computing entity 132 may be embodied as an artificial intelligence (AI) computing entity, such as an Amazon Echo, Amazon Echo Dot, Amazon Show, Google Home, and/or the like. Accordingly, the client computing entity 132 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

Various embodiments described herein are generally related to improving intelligence and efficiency in test designing and planning, and specifically to minimizing testing redundancy and to managing changes and change impacts or effects within the testing environment. Due at least in part on generation and optimization of a graph data structure representing a plurality of test cases, various embodiments reduce computational resources and time that would be otherwise dedicated to designing redundant test cases/steps, searching for potentially redundant test cases/steps within a large repository, and executing redundant test cases/step, and as a result, operational reliability and throughput of test designer systems 101 and/or test execution systems are improved. Additionally, unsupervised and supervised machine learning models may be used to identify specific testing aspects that are related to and impacted by a given change, thereby improving computational efficiency in maintaining a large number of test cases in light of many evolutions.

As described below, various embodiments of the present disclosure address technical challenges related to reducing the amount of configuration data stored for software testing data objects that describe configuration data associated with software testing modules. The storage size of a software testing data object correlates with the number of test steps described by the software testing data object. In some embodiments, by automatically removing redundant test steps in accordance with the techniques described herein, various embodiments of the present invention reduce the storage size of software testing data objects and improve storage-wise efficiency of automated software testing platforms.

FIG. 4 provides a flowchart diagram illustrating an example process 400 for generating and optimizing a graph data structure representing a plurality of test cases. The graph data structure and process 400 may be scalable for a plurality of test modules each being associated with one or more test cases. In various embodiments, the system computing entity 136 comprises means, such as the processing elements 205, memory media 210, 215, network interface 220, and/or the like, for performing steps/operations of process 400 to generate and optimize a graph data structure.

Process 400 includes step/operation 401, at which text data defining a plurality of test cases is obtained. Each test case is defined by text data for a plurality of test steps, text data for at least one test description, and text data for at least one test outcome requirement, and a test case may be defined in a structured, semi-structured, or unstructured manner. As discussed, each text data may be in the form of natural language; for example, an author of a test case may use natural language to describe the plurality of test steps, the at least one test description and the at least one test outcome requirement.

In various embodiments, obtaining the text data further includes pre-processing the text data. Within pre-processing, spelling may be corrected and root words may be extracted. For instance, pre-processing may involve performing clubbing on the text data, in various embodiments. In some embodiments, a rule-based approach may be used to search for contextual words, phrases, and abbreviations that may be particularly relevant to the testing domain 122 and should be treated explicitly wherever found. Rules for such context enablement may be stored by the system computing entity 136, the storage subsystem 134, and/or the like to be accessed when performing pre-processing with text data generally.

In some examples, the text data may be unstructured or semi-structured, and as such, the text data specifically for the at least one test outcome requirement may be extracted from other text data, such as text data for a test description. One or more natural language processing (NLP) models may be configured and used to identify and extract test outcome requirements from test descriptions defined in natural language; for instance, words including should or will may be indicative of a test outcome requirement. Similarly, test steps may be extracted from text data for the test description, and may be identified by verbiage in second person perspective, for example.

Process 400 includes step/operation 402, at which embeddings of the test steps are generated from the text data. In various embodiments, embeddings and/or other representations of the text data for each test step are generated using an unsupervised machine learning model. For example, a test step that is click the button labelled "submit" may be transformed into and represented by numerical embeddings in a vector or array form using an unsupervised machine learning model. Such unsupervised machine learning models may include various language and/or NLP models, such as auto-encoders. Generation of embeddings for test steps may involve processing of a larger set of text data within which the test steps are described such that document embedding (e.g., doc2vec techniques) can be performed. Within such document embeddings, each token or word of a test step may be embedding based at least in part on its frequency of occurrence within the document or larger set of text data. Generation of embeddings may involve configuration of minimum and maximum document frequencies in order to minimize the feature space and sparsity for key words for describing test steps.

From here, steps/operations may be performed for each test step of each test case to generate the graph data structure. For a first test step for the graph data structure (e.g., the graph data structure includes zero nodes), step/ operation 403 may first be performed. At step/operation 403, a node representing the first test step is added to the graph data structure. In various embodiments, a generated node is associated (e.g., tagged) with a test description associated with the test case to which the represented test step belongs. Similar to the test steps, embeddings or representations for test descriptions may be generated using an unstructured machine learning model, and test descriptions that are related, similar or redundant with each other can be identified and standardized (e.g., by averaging or combining embeddings). In any regard, a node representing a test step is associated with a test description for each test case to which the test step belongs, enabling nodes that are associated with the same or similar test descriptions to be connected via segments. Additionally or alternatively, a node representing a test step can be associated with a unique identifier for each test case to which the test step belongs.

After the graph data structure includes any number of nodes representing test steps, step/operation 404 may be performed for each test step of each test case. At step/operation 404, a similarity measure is determined between the test step and each test step represented by nodes of the graph data structure. That is, the subject test step is compared to other test steps already processed and represented by the graph data structure to determine whether the subject test step is redundant or not.

In various embodiments, this comparison of a subject test step and other test steps is performed with respect to the embeddings of each test step. A difference between embeddings or other representations of fixed-length may be quantified using cosine-based similarity values, which measure the cosine of the angle between the embeddings or representations as vectors projected in a multi-dimensional space. Accordingly, a similarity measure such as a cosine-based similarity value can be determined for each pair of test steps.

From step/operation 404, process 400 may continue to step/operation 405, at which it is determined whether at least one similarity measure satisfies a configurable threshold. The configurable threshold may indicative a level of acceptable similarity or redundancy, and if satisfied by a similarity measure for a pair of test steps, then the pair of test steps may be considered to be similar or redundant. Alternatively, if not satisfied, then the pair of test steps may be considered to be unique or independent. In various embodiments, the threshold may be configured and fixed by a user. For instance, given that the similarity measures are cosine-based similarity values ranging from 0 to 1, an example threshold may be 0.85 with values over 0.85 satisfying the threshold. In this example however, the threshold may be set anywhere between 0 to 1 as deemed appropriate. In some embodiments, the threshold may be configured based at least in part on historical data and distributions of similarity measures.

If it is determined that at least one similarity measure satisfies the configurable threshold, then the subject test step is redundant with a given test step. That is, a redundancy condition between test steps is detected. As such, the subject test step is then not represented by a node of the graph data subject, and another test step is then considered and processed. Otherwise, if the similarity measures do not satisfy the configurable threshold, then the subject test step is unique and independent. As a result, step/operation 403 may be performed to add a node to represent the subject test step within the graph data structure. Upon adding the new node, another test step may then be considered and processed. Test steps may be iteratively processed until each test step has been considered for redundancy and representation by a node.

Upon generation of the plurality of nodes representing unique, non-redundant, and/or independent test steps, generation of the graph data structure continues. Process 400 includes step/operation 406, at which a plurality of segments or graph edges are generated. Each segment connects two nodes of the graph data structure, and in particular, a segment is generated between two nodes that represent test steps belonging to the same test case. Determination that two nodes are associated with a common test case may be enabled as each node is associated with test descriptions and/or unique identifiers for corresponding test cases. That is, for each test case to which the represented test step belongs, a node may be associated or tagged with a test description or a unique identifier. Thus, generation of a segment may involve determining which nodes are associated with the same test description or unique identifier.

In various embodiments, a segment is configured to identify the particular test case to which the two test steps represented by the two connected nodes belong; for example, the segment is labelled with a unique identifier associated with the particular test case. Then, for a test case having more than two test steps, the test case is represented by a graph path including one or more segments and connecting the nodes representing the more than two test steps in a traversable sequence or order in accordance with the sequence of test steps defined for the test case. Thus, with the generation of the segments, the graph data structure is configured to represent test steps belonging to a plurality of test cases and to represent the plurality of test cases themselves.

Process 400 includes step/operation 407, at which the graph data structure is optimized to identify and minimize redundancies between test cases. While the test steps across test cases are essentially standardized with redundancies largely reduced as nodes of the graph data structure are generated, the graph data structure may still include multiple paths that traverse through the same nodes in the same order. If a first test case is represented by a path including segments traversing through nodes in a particular sequence and a second test case is represented by another path that includes parallel segments traversing through the same nodes in the same particular sequence, then the two test cases may be considered to be substantially similar or redundant. In traversing through the same nodes, the two test cases should generally include the same number of test steps in order to be considered redundant with each other. Accordingly, the segments for one of the test cases may be removed from the graph data structure, and further, one of the test cases may be removed from the test case repository 104 entirely, in some example embodiments.

Having described process 400 for generating and optimizing a graph data structure, an example graph data structure 106 is shown in FIG. 5. As shown in FIG. 5, the graph data structure 106 includes a plurality of nodes 502 and a plurality of segments 504 connecting the nodes 502. Generally, as discussed, the nodes 502 are configured to represent unique test steps across a plurality of test cases (e.g., a test case repository 104), and the segments 504 are configured to represent and identify the test cases themselves.

For instance, each node 502 may be a standardized representation of one or more test steps that belong to a plurality of test cases and that may be defined different in natural language text. With one node 502 effectively representing potentially multiple test steps that are determined to be redundant or substantially similar, a total number of nodes 502 required to represent a given population of test steps may be reduced. In various embodiments, a node 502 being a standardized representation of one or more test steps may indicate or display text data for one of the one or more test steps. In other example embodiments, the node 502 may indicate or display text data that is an average, an accumulation, a summarization, and/or the like of the text data for each of the one or more test steps.

In various embodiments, a segment 504 may be indicated, labelled, and/or displayed with a unique identifier associated with the represented test case. As test cases involve a specified sequence or order of test steps, the segments 504 of the graph data structure 106 may be directional in nature, indicating a flow from one of the two connected nodes 502 to the other. As shown in FIG. 5, multiple segments 504 may span between the same two nodes 502, which may suggest that the two nodes 502 are commonly performed steps across the multiple test cases represented by the multiple segments 504. However, with the graph data structure 106 being optimized to reduce redundancy between test cases, the multiple segments 504 spanning between two given nodes 502 may branch off in different directions to different nodes 502.

FIG. 6 provides a flowchart diagram illustrating an example process 600 for providing an automated and intelligent analysis of testing changes. As discussed, testing changes may include changes (e.g., addition, modification, removal) of certain test steps, test cases, aspects and functionalities of a testing domain 122, test descriptions, and/or the like. The process 600 may generally be performed to identify certain test steps, test cases, test modules, test outcome requirements, test descriptions, and/or the like that may be affected as a result of said testing changes. Further, process 600 may involve updating the graph data structure representing the test cases/steps to reflect said testing changes. In various embodiments, the system computing entity 136 comprises means, such as the processing elements 205, memory media 210, 215, network interface 220, and/or the like, for performing steps/operations of process 600 to provide an automated and intelligent analysis of testing changes.

Process 600 includes step/operation 601, at which a query describing a testing change is received. In some examples, the query may be received from a client computing entity 102, such as via an application programming interface (API). That is, in various embodiments, the query is an API query, request, call, and/or the like that is handled by providing a corresponding API response, such as a change report. In various embodiments, the testing change is described by text data within the query in the form of natural language. Generally, the testing change may be a modification, addition, or removal of a test step, a test case, a non-standardized or standardized test description, a test module, a test outcome requirement, and/or the like. Further, the testing change may also be a modification, addition, or removal of an aspect (e.g., an interactable object displayed in an application under test) and/or functionality of a testing domain. In various embodiments, the query may be preprocessed in order to enable NLP to generally be performed with the query and its text data.

Process 600 further includes step/operation 602, at which features of the testing change are extracted using an unsupervised machine learning model. The unsupervised machine learning model used to generate embeddings for test steps may be used again here to extract features of the testing change. That is, the extracted features may include various embeddings of the testing change. Through extraction of the features of the testing change, the type of testing change (e.g., modification, addition, removal), the object of testing change (e.g., a test step, a test outcome requirement), and various parameters of the testing change may be determined automatically by the unsupervised machine learning model.

Process 600 further includes step/operation 603, at which portions of the graph data structure that are relevant to the testing changes are identified. In various embodiments, portions of the graph data structure are identified using the extracted features. For instance, the testing change may reference a particular test step, and detection of such indicative features may result in a corresponding node being identified. With this example, the particular test step may be described by text data within the testing change, and similar to the generation of the graph data structure, an embedding of the particular test step described by the testing change may be compared (via similarity measures) with embeddings of other test steps represented by the graph data structure. As such, a node that is relevant to the testing change can be identified, as can segments that lead to and depart from said node.

In some examples, the testing change may specifically be the addition of a new test step, but a relevant node (e.g., similar and redundant) may be identified within the graph data structure. That is, the new test step specified by the query is redundant with another test step, and in such an instance, a response may be provided to the query that includes a recommendation to use the existing test step. Likewise, the testing change may specifically be the addition of a new test case having certain test steps, and upon identification of an existing test case via segments of the graph data structure, a recommendation to use the existing test case may be provided. Accordingly, the minimization of redundancy through the graph data structure may continue to be provided as additional test steps and cases are requested.

Process 600 further includes step/operation 604, at which test modules and test outcome requirements that are impacted by the testing change are predicted using one or more supervised machine learning models. With the one or more supervised machine learning models serving as classification models, the extracted features of the testing change can be classified with respect to a test description, a test module, and/or a test outcome requirement. In certain examples, a predicted classification may be accompanied with a confidence or probability measure. In various embodiments, the supervised machine learning models may include random forest models, naïve bayes models, logistic regression models, and/or the like that are configured and trained to the optimal weights for input vector representation to reduce cross-entropy loss during classification of test outcome requirements and test descriptions. Accordingly, the one or more supervised machine learning models accurately classify the testing change as being relevant to a particular test description and/or a particular test requirement.

In various embodiments, a test description may be associated with at least one test outcome requirement as defined by a test case, and as such, the supervised machine learning models may be configured for prediction and classification of test descriptions primarily, with test outcome requirements being inferred via the predicted test description.

Using a predicted test description and/or test requirement, certain test steps, test cases, and test modules can be identified. As discussed, nodes 502 of the graph data structure may be associated or tagged with relevant test descriptions, and thus, the graph data structure may be referenced to identify test steps, test cases, and test modules that are relevant and related to the predicted test description and/or test requirement.

Process 600 further includes step/operation 605, at which a change report and/or an updated graph data structure is provided. The change report in particular may indicate the test modules and/or test outcome requirements that are predicted to be relevant to and impacted by the textual change. The change report may indicate further testing aspects relevant to the testing change of the query. In doing so, the change report enables a user to efficiently accommodate changes throughout a large repository of test cases and test steps by specifically identifying testing aspects that are impacted and require accompanying changes or updates.

Meanwhile, the graph data structure and the test cases in general may be updated in accordance with the testing change. If the testing change indicates the addition of a new test step or a new test case, and if it is determined that the new test step or new test case is not redundant with any existing test step or test case using similarity measures and the graph data structure, then the new test step or the new test case may be accordingly added. In such examples, the graph data structure may be updated to reflect such additions. Upon enacting such changes, the unsupervised and/or the supervised machine learning models may be reconfigured and retrained in light of the changed testing aspects. With this, the change report may provide various metrics, including a number of test steps updated, a number of test steps deleted, a number of test steps added, a number of test cases changed, and/or the like, in various embodiments.

Process 600 further includes step/operation 606, which involves performing one or more automated prediction-based actions and/or optimized testing actions. In various embodiments, the automated prediction-based actions and/or optimized testing actions are enabled by the updated graph data structure and/or the change report. With identification of redundant test cases/steps through optimization of the graph data structure, redundant test cases/steps may be automatically removed from the test case repository and a notification may be provided to a user. In an example embodiment, the change report further indicates redundant test cases/steps that have been removed.

In various embodiments, the one or more automated prediction-based actions are enabled through the generation of user interface data. FIG. 7 provides an example user interface 700 that may be generated, transmitted (e.g., to a client computing entity 132), and/or rendered for display during step/operation 606, for example. In an example embodiment, the user interface 700 is configured to display the graph data structure 106 in its optimized and/or updated form. In the illustrated embodiment, the graph data structure 106 includes nodes 502 for seven unique test steps (steps A-G) and segments 504 for four test cases (cases i-iv). The graph data structure 106 is accordingly displayed to a user such that the user may quickly and visually ascertain different test cases and test steps belonging to a test case repository. In some embodiments, the user may further update and modify the graph data structure 106 via the user interface 700, and changes made via the graph data structure 106 may be communicated from the user interface 700 to the test designer system 101 as a test change query. The user interface 700 may further indicate test outcome requirements 702 that are associated with the test cases represented by the graph data structure 106. For instance, the illustrated embodiment indicates three test outcome requirements 702 (requirements x, y, z) that are objectives of the four test cases (cases i-iv).

In an example embodiment, the user interface 700 enables a user to input text for a test change query. In the illustrated example, text has been entered to describe a new test case having steps A, C, E, F, and G. The user interface 700 may be further configured to indicate the change report 704 in response to the test change query.

Further, the user interface 700 may be used to generally enable various further automated actions. In some examples, the automated actions may include initiating automated testing with the optimized (e.g., non-redundant) repository of test cases, and as shown in FIG. 7, the user interface 700 may enable a user to initiate said automated testing. In various embodiments, initiation of testing may include various constraints, such as specifically selected test cases to perform or specifically selected test outcome requirements to test.

In various embodiments, the automated actions may include provisioning and configuring of a post-prediction system, such as a system configured to execute the test cases within the testing domain. For instance, given an optimized volume of test cases to perform, computational and operational resources can be optimized within the post-prediction system in order to efficiently execute the test cases. Various dependencies between test steps as well as common steps between test cases may be relied upon to conserve such computational and operational resources of the post-prediction system. Further, the test modules and the test requirements predicted to be relevant to a test change query may also be used in optimizing the post-prediction system, such as by configuring communication bandwidth used by the post-prediction system in remotely accessing the testing domain and/or different test modules.

Therefore, various embodiments described herein improve computational efficiency and intelligence during test designing and further improve operational throughput with respect to test execution. With an optimized graph data structure being generated to represent a plurality of test cases, computational resources and time that would be otherwise dedicated to designing redundant test cases/steps, searching for potentially redundant test cases/steps within a large repository, and executing redundant test cases/step are conserved. As a result, test designer systems 101 and/or test execution systems experience improved operational reliability and throughput, in various examples. Further, both unsupervised and supervised machine learning models may be used to identify specific testing aspects that are related to and impacted by a given change, thus enabling a testing workflow or environment to evolve with improved computational efficiency.

Accordingly, as described above, various embodiments of the present disclosure address technical challenges related to reducing the amount of configuration data stored for software testing data objects that describe configuration data associated with software testing modules. The storage size of a software testing data object correlates with the number of test steps described by the software testing data object. In some embodiments, by automatically removing redundant test steps in accordance with the techniques described herein, various embodiments of the present invention reduce the storage size of software testing data objects and improve storage-wise efficiency of automated software testing platforms.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method comprising:
generating, using one or more processors, a graph data structure comprising (i) a plurality of nodes each representing a test step belonging to one or more test cases of a software testing data object for a software application platform, wherein each node of the graph data structure is associated with one or more standardized test descriptions that are generated using one or more supervised machine learning models, and (ii) a plurality of segments each connecting two nodes and identifying a particular test case comprising two test steps represented by the two nodes;
receiving, using the one or more processors, a test change query describing a testing change to the software testing data object;
generating, using the one or more processors and a natural language processing (NLP) machine learning model, one or more extracted features from the test change query;
based at least in part on the one or more extracted features, and using the one or more processors and the one or more supervised machine learning models, generating one or more test outcome requirements and one or more graph portions of the graph data structure relevant to the testing change; and
in response to the test change query and using the one or more processors:
generating an updated graph data structure by modifying the one or more graph portions based at least in part on the one or more extracted features,
generating a change report indicating the one or more test outcome requirements, and
initiating the performance of one or more prediction-based actions based at least in part on the updated graph data structure and the change report.

2. The computer-implemented method of claim 1, wherein the one or more standardized test descriptions are generated based at least in part on the one or more extracted features and are derived at least in part from the one or more test cases to which the test step represented by the node belongs.

3. The computer-implemented method of claim 2, wherein the plurality of nodes of the graph data structure are independent with respect to the one or more standardized test descriptions associated with each node.

4. The computer-implemented method of claim 2, wherein each standardized test description of the one or more standardized test descriptions is associated with at least one test outcome requirement using the one or more supervised machine learning models.

5. The computer-implemented method of claim 2, wherein the one or more standardized test descriptions associated with each node of the graph data structure are used to determine the plurality of segments connecting the plurality of nodes.

6. The computer-implemented method of claim 1, wherein generating the graph data structure comprises, for a particular test step of the particular test case:
generating an embedding for the particular test step using the NLP machine learning model;
determining a similarity measure between the embedding for the particular test step and a plurality of embeddings associated with the plurality of nodes of the graph data structure; and
responsive to the similarity measure not satisfying a threshold, adding a new node to the graph data structure to represent the particular test step.

7. The computer-implemented method of claim 6, wherein generating the graph data structure further comprises:
determining a redundancy condition between two test cases identified by two subsets of segments connecting a shared subset of nodes of the graph data structure; and
removing one of the two subsets of segments from the graph data structure.

8. The computer-implemented method of claim 1, wherein the one or more supervised machine learning models comprise:
a module identification machine learning model that is configured to generate, based at least in part on the one or more extracted features, a target module subset of a plurality of software modules of the software application platform, and
a requirement identification machine learning model that is configured to generate, based at least in part on the one or more extracted features and the target module subset, the one or more test outcome requirements.

9. The computer-implemented method of claim 8, wherein the change report further indicates inferences made by the module identification machine learning model for the target module subset.

10. A computing system comprising one or more processors and memory comprising computer program code, the memory and the computer program code configured to, with the one or more processors, cause the computing system to:
generate a graph data structure comprising (i) a plurality of nodes each representing a test step belonging to one or more test cases of a software testing data object for a software application platform, wherein each node of the graph data structure is associated with one or more standardized test descriptions that are generated using one or more supervised machine learning models, and (ii) a plurality of segments each connecting two nodes and identifying a particular test case comprising two test steps represented by the two nodes;
receive a test change query describing a testing change to the software testing data object;
generate one or more extracted features from the test change query using a natural language processing (NLP) machine learning model;
based at least in part on the one or more extracted features, generate one or more test outcome requirements and one or more graph portions of the graph data structure relevant to the testing change using the one or more supervised machine learning models; and
in response to the test change query:
generate an updated graph data structure by modifying the one or more graph portions based at least in part on the one or more extracted features,
generate a change report indicating the one or more test outcome requirements, and
initiating the performance of one or more prediction-based actions based at least in part on the updated graph data structure and the change report.

11. The computing system of claim 10, wherein the one or more standardized test descriptions are generated based at least in part on the one or more extracted features and are derived at least in part from the one or more test cases to which the test step represented by the node belongs.

12. The computing system of claim 11, wherein the plurality of nodes of the graph data structure are independent with respect to the one or more standardized test descriptions associated with each node.

13. The computing system of claim 11, wherein each standardized test description of the one or more standardized test descriptions is associated with at least one test outcome requirement using the one or more supervised machine learning models.

14. The computing system of claim 11, wherein the one or more standardized test descriptions associated with each node of the graph data structure are used to determine the plurality of segments connecting the plurality of nodes.

15. The computing system of claim 10, wherein generating the graph data structure comprises, for a particular test step of the particular test case:
- generating an embedding for the particular test step using the NLP machine learning model;
- determining a similarity measure between the embedding for the particular test step and a plurality of embeddings associated with the plurality of nodes of the graph data structure; and
- responsive to the similarity measure not satisfying a threshold, adding a new node to the graph data structure to represent the particular test step.

16. The computing system of claim 15, wherein generating the graph data structure further comprises:
- determining a redundancy between two test cases identified by two subsets of segments connecting a shared subset of nodes of the graph data structure; and
- removing one of the two subsets of segments from the graph data structure.

17. The computing system of claim 10, wherein the one or more supervised machine learning models comprise:
- a module identification machine learning model that is configured to generate, based at least in part on the one or more extracted features, a target module subset of a plurality of software modules of the software application platform, and
- a requirement identification machine learning model that is configured to generate, based at least in part on the one or more extracted features and the target module subset, the one or more test outcome requirements.

18. The computing system of claim 17, wherein the change report further indicates inferences made by the module identification machine learning model for the target module subset.

19. A computer program product comprising a computer-readable storage medium having computer-readable program code portions stored therein, the computer-readable program code portions including executable portions configured to cause one or more processors to:
- generate a graph data structure comprising (i) a plurality of nodes each representing a test step belonging to one or more test cases of a software testing data object for a software application platform, wherein each node of the graph data structure is associated with one or more standardized test descriptions that are generated using one or more supervised machine learning models, and (ii) a plurality of segments each connecting two nodes and identifying a particular test case comprising two test steps represented by the two nodes;
- receive a test change query describing a testing change to the software testing data object;
- generate one or more extracted features from the test change query using a natural language processing (NLP) machine learning model;
- based at least in part on the one or more extracted features, generate one or more test outcome requirements and one or more graph portions of the graph data structure relevant to the testing change using the one or more supervised machine learning models; and
- in response to the test change query:
  - generate an updated graph data structure by modifying the one or more graph portions based at least in part on the one or more extracted features,
  - generate a change report indicating the one or more test outcome requirements, and
  - initiating the performance of one or more prediction-based actions based at least in part on the updated graph data structure and the change report.

20. The computer program product of claim 19, wherein the one or more standardized test descriptions are generated based at least in part on the one or more extracted features and are derived at least in part from the one or more test cases to which the test step represented by the node belongs.

* * * * *